United States Patent
Chung et al.

(10) Patent No.: US 11,211,871 B1
(45) Date of Patent: Dec. 28, 2021

(54) DIRECT-CURRENT (DC) VOLTAGE CONVERSION DEVICE

(71) Applicants: SUZHOU MEAN WELL TECHNOLOGY CO., LTD., Suzhou (CN); MEAN WELL (GUANGZHOU) ELECTRONICS CO., LTD., Guangzhou (CN)

(72) Inventors: Yu-Wei Chung, Guangzhou (CN); Ya-Jhe Liu, Guangzhou (CN); Shih-Jung Huang, Guangzhou (CN)

(73) Assignees: Suzhou Mean Well Technology Co., Ltd., Jiang Su (CN); Mean Well (Guangzhou) Electronics Co., Ltd., Guangzhou (CN)

( * ) Notice: Subject to any disclaimer, the term of this patent is extended or adjusted under 35 U.S.C. 154(b) by 0 days.

(21) Appl. No.: 17/012,498

(22) Filed: Sep. 4, 2020

(30) Foreign Application Priority Data

Aug. 4, 2020 (CN) .......................... 202010771836.7

(51) Int. Cl.
*H02M 3/335* (2006.01)
*H02M 3/00* (2006.01)

(52) U.S. Cl.
CPC ... *H02M 3/33569* (2013.01); *H02M 3/33538* (2013.01); *H02M 3/01* (2021.05); *H02M 3/33571* (2021.05)

(58) Field of Classification Search
CPC ............ H02M 3/00; H02M 3/01; H02M 3/22; H02M 3/24; H02M 3/325; H02M 3/335; H02M 3/33507; H02M 3/3353; H02M 3/33569; H02M 3/33571; H02M 3/33538; H02M 3/33546
See application file for complete search history.

(56) References Cited

U.S. PATENT DOCUMENTS

| | | | |
|---|---|---|---|
| 8,284,576 B2 * | 10/2012 | Danesh-Pajooh-Nejad | ................ H02M 3/33584 363/65 |
| 2013/0201725 A1 * | 8/2013 | Boysen | ............... H02M 3/3376 363/15 |
| 2015/0180350 A1 * | 6/2015 | Huang | .............. H02M 3/33507 307/66 |

* cited by examiner

*Primary Examiner* — Gary L Laxton
(74) *Attorney, Agent, or Firm* — Rosenberg, Klein & Lee

(57) ABSTRACT

A direct-current (DC) voltage conversion device includes a resonate driving device, at least two second transformers, at least two second transformers, at least two third transformers, and a rectifying device. The primary sides of the second transformers are connected in series via a first conductive wire and coupled to the resonate driving device via a second conductive wire. The primary sides of the second transformers are connected in series via a third conductive wire and coupled to the resonate driving device via a fourth conductive wire. The primary sides of the third transformers are connected in series via a fifth conductive wire and coupled to the resonate driving device via a sixth conductive wire. The rectifying device is coupled to the secondary sides of the transformers.

11 Claims, 3 Drawing Sheets

DIRECT-CURRENT (DC) VOLTAGE CONVERSION DEVICE

This application claims priority for Chinese patent application no. 202010771836.7 filed on 4 Aug. 2020, the content of which is incorporated by reference in its entirely.

BACKGROUND OF THE INVENTION

Field of the Invention

The present invention relates to a voltage conversion device, particularly to a direct-current (DC) voltage conversion device.

Description of the Related Art

The direct-current (DC)-to-DC converter, also known as a DC-DC converter or a DC transformer, is a circuit or an electromechanical device that converts electrical energy. The DC-to-DC converter can convert DC power into different DC voltages whose power ranges from a very low value (e.g., a small battery) to a very high value (e.g., high voltage conversion). The input voltage and the output voltage of some DC-DC converters have the same reference point, while the input voltage and the output voltage of some DC-DC converters separate from each other.

FIG. 1 is a diagram schematically illustrating a conventional three-phase direct-current (DC) voltage conversion device. As illustrated in FIG. 1, the three-phase DC voltage conversion device 1 includes six electrical switches 10, three transformers 12, three resonate tanks 14, six diodes 16, and an input capacitor 18, and an output capacitor 19. The electrical switches 10 are divided into three groups, wherein all the groups are connected in parallel and connected to the input capacitor 18 in parallel. Each group is connected to the transformer 12 through the resonate tank 14. The resonate tank 14 includes an inductor and a capacitor connected in series. The diodes 16 are divided into three groups, wherein all the groups are connected in parallel and connected to the output capacitor 19 in parallel. The diodes 16 of each group are connected to the transformer 12. Assume the designed specification to have an input DC voltage of 800 V, an output DC voltage of 100 V, an output DC current of 200 A, and an output power 20 kW·h. Three transformers with high output voltage are required. However, such a transformer is large in size, unfavorable for layout, and inconvenient for winding. In addition, the transformer has higher copper loss. The root-mean-square value of the current of the secondary side of the transformer 12 is 130 amperes. If the current of the secondary side is 6 A/mm$^2$, it is necessary to use 2600 Litz wires each having a diameter of 0.1 mm. The Litz wires are not easy to produce.

To overcome the abovementioned problems, the present invention provides a direct-current (DC) voltage conversion device.

SUMMARY OF THE INVENTION

The present invention provides a direct-current (DC) voltage conversion device, which is favorable layout and easy to perform a heat treatment and fabricate Litz wires. The DC voltage conversion device can reduce copper loss and uniformly output high current and high current when achieving the same high power.

In an embodiment of the present invention, a DC voltage conversion device includes a resonate driving device, at least two first transformers, at least two second transformers, at least two third transformers, and a rectifying device. The primary sides of the first transformers are connected in series via at least one first conductive wire. The primary sides of the at least two first transformers have a first input and a second input, the first input is coupled to the resonate driving device via a second conductive wire, and the secondary side of each of the first transformers has a first output and a second output. The primary sides of the second transformers are connected in series via at least one third conductive wire. The primary sides of the second transformers have a third input and a fourth input, the third input is coupled to the resonate driving device via a fourth conductive wire, and the secondary side of each of the at least two second transformers has a third output and a fourth output. The primary sides of the third transformers are connected in series via at least one fifth conductive wire. The primary sides of the third transformers have a fifth input and a sixth input, the fifth input is coupled to the resonate driving device via a sixth conductive wire, the secondary side of each of the third transformers has a fifth output and a sixth output, the second input, the fourth input, and the sixth input are coupled to each other, and the second output, the fourth output, and the sixth output are coupled to each other. The rectifying device is coupled to the first output, the third output, and the fifth output.

In an embodiment of the present invention, the total length of the first conductive wire and the second conductive wire, the total length of the third conductive wire and the fourth conductive wire, and the total length of the fifth conductive wire and the sixth conductive wire are equal.

In an embodiment of the present invention, the rectifying device is respectively coupled to the first outputs of the first transformers via at least two seventh conductive wires, the rectifying device is respectively coupled to the third outputs of the second transformers via at least two eighth conductive wires, the rectifying device is respectively coupled to the fifth outputs of the third transformers via at least two ninth conductive wires, and the total length of the seventh conductive wires, the total length of the eighth conductive wires, and the total length of the ninth conductive wires are equal.

In an embodiment of the present invention, the rectifying device includes two first rectifiers connected in series, two second rectifiers connected in series, two third rectifiers connected in series, two fourth rectifiers connected in series, two fifth rectifiers connected in series, and two sixth rectifiers connected in series. A node between the two first rectifiers and a node between the two second rectifiers are respectively coupled to the first outputs of the first transformers. A node between the two third rectifiers and a node between the two fourth rectifiers are respectively coupled to the third outputs of the second transformers. A node between the two fifth rectifiers and a node between the two sixth rectifiers are respectively coupled to the fifth outputs of the third transformers, and the first rectifiers are connected to the second rectifiers, the third rectifiers, the fourth rectifiers, the fifth rectifiers, and the sixth rectifiers.

In an embodiment of the present invention, the first rectifiers, the second rectifiers, the third rectifiers, the fourth rectifiers, the fifth rectifiers, and the sixth rectifiers are diodes.

In an embodiment of the present invention, the resonate driving circuit includes a current switching device and a resonate circuit coupled to the current switching device, the second conductive wire, the fourth conductive wire, and the sixth conductive wire.

In an embodiment of the present invention, the current switching device includes two first electrical switches connected in series, two second electrical switches connected in series, and two third electrical switches connected in series. A node between the two first electrical switches is coupled to the resonate circuit. A node between the two second electrical switches is coupled to the resonate circuit. A node between the two third electrical switches is coupled to the resonate circuit, and the first electrical switches are connected to the second electrical switches in parallel and connected to the third electrical switches in parallel.

In an embodiment of the present invention, the first electrical switches, the second electrical switches, and the third electrical switches are N-channel metal oxide semiconductor field effect transistors (NMOSFETs).

In an embodiment of the present invention, the resonate circuit includes a first resonate tank coupled between the second conductive wire and the current switching device; a second resonate tank coupled between the fourth conductive wire and the current switching device; and a third resonate tank coupled between the sixth conductive wire and the current switching device.

In an embodiment of the present invention, each of the first resonate tank, the second resonate tank, and the third resonate tank comprises an inductor and a capacitor connected in series.

In an embodiment of the present invention, the total number of the first transformers, the second transformers, and the third transformers is 3×N, and N is a positive integer larger than or equal to 2.

To sum up, the DC voltage conversion device connects the primary sides of transformers in series and connects the secondary sides of the transformers in parallel. Thus, the DC voltage conversion device is favorable layout and easy to perform a heat treatment and fabricate Litz wires. The DC voltage conversion device can reduce copper loss and uniformly output high current and high current when achieving the same high power.

Below, the embodiments are described in detail in cooperation with the drawings to make easily understood the technical contents, characteristics and accomplishments of the present invention.

DETAILED DESCRIPTION OF THE INVENTION

Figure 1:
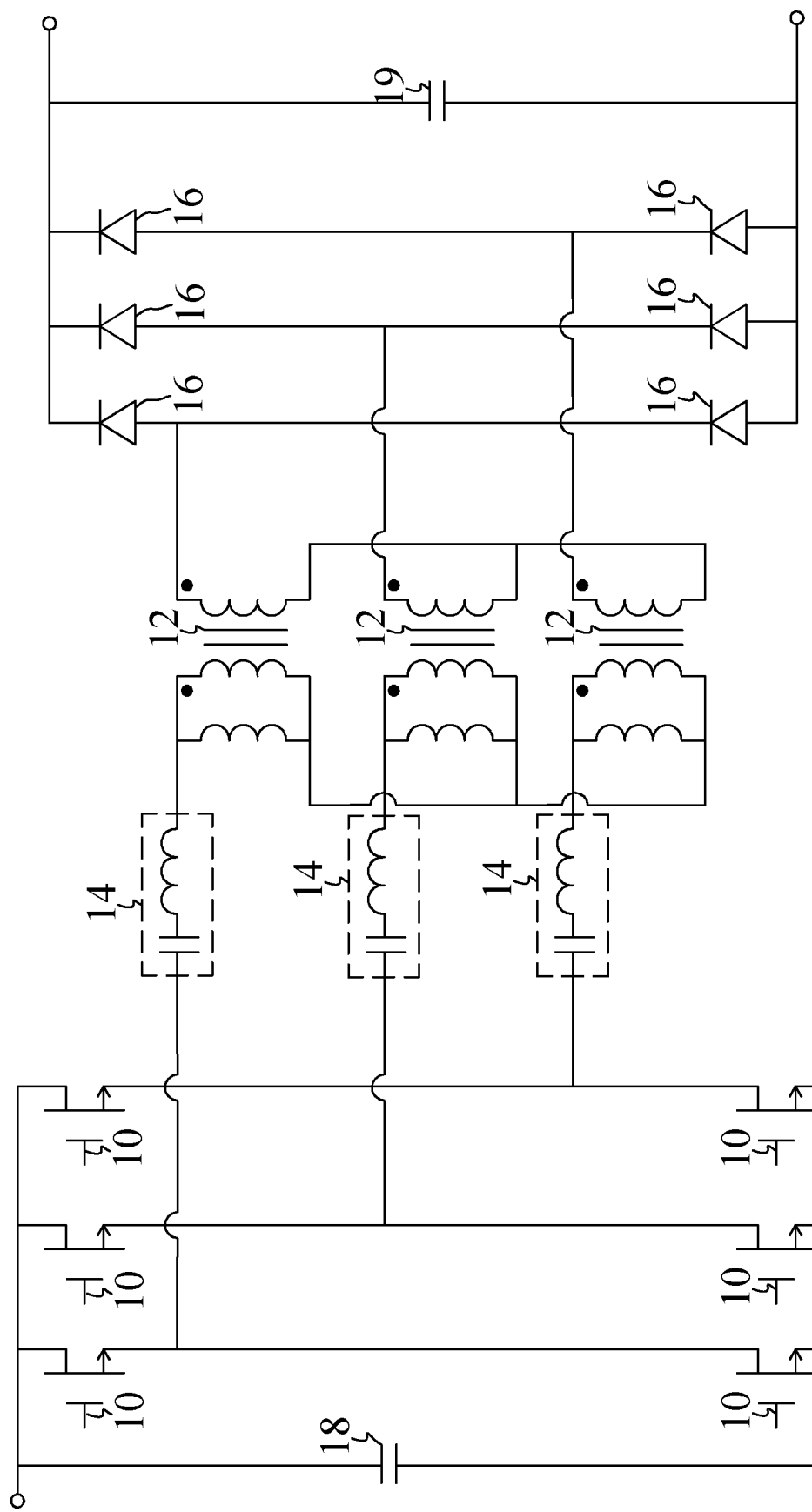
FIG. 1 is a diagram schematically illustrating a conventional three-phase direct-current (DC) voltage conversion device.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In the following description, a direct-current (DC) voltage conversion device will be provided. The DC voltage conversion device uses two airbags as dual phantom lungs. The computed tomography images of the airbags are more similar to those of living lungs of a human body. The depth of a phantom tumor is freely adjusted in the airbag without affecting the inflating effect, thereby simulating the movement of the living tumor of a patient. The phantom lungs are controlled in a closed loop way in order to accurately simulate breathing of the patient.

Figure 2:
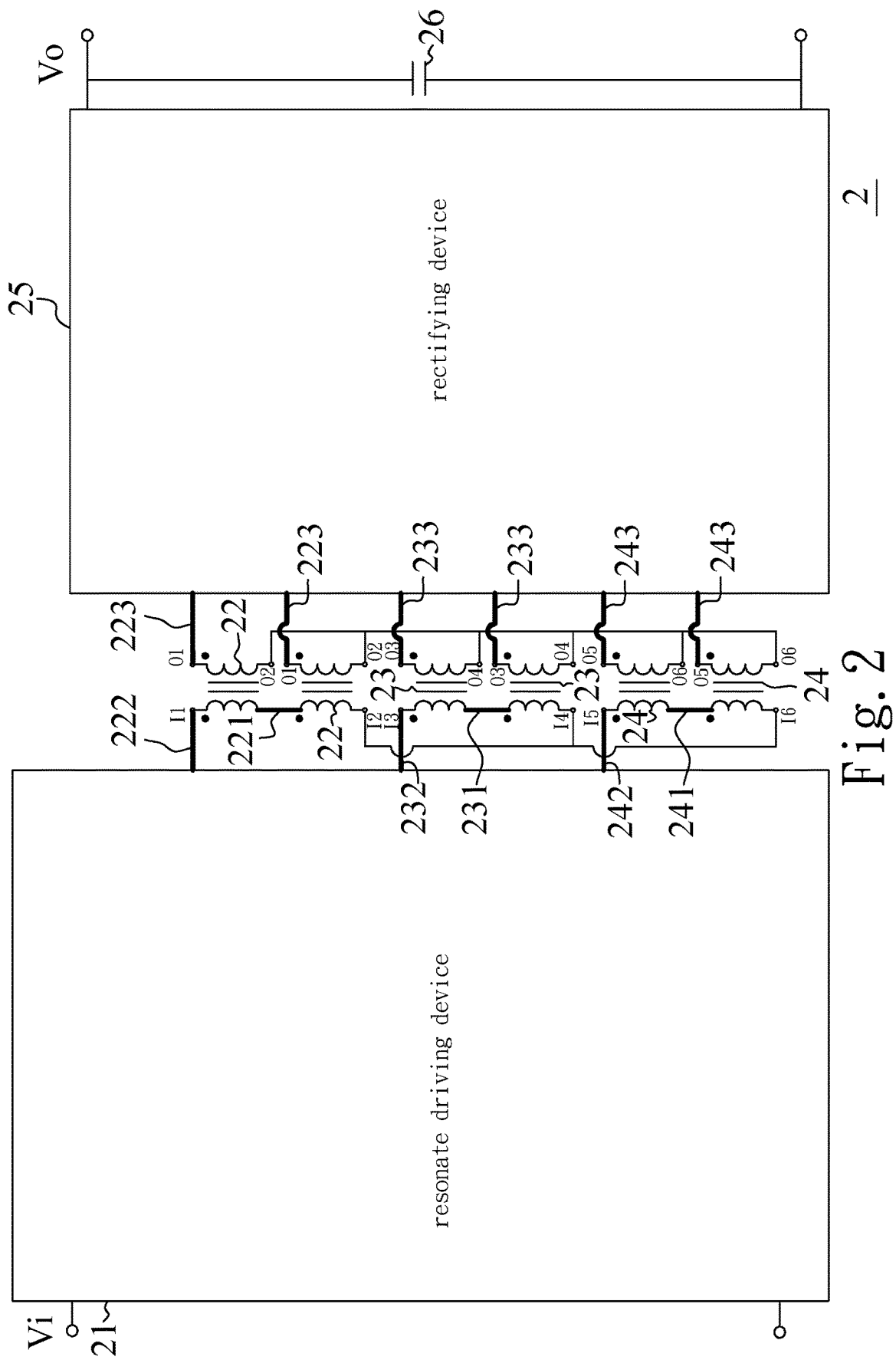
FIG. 2 is a diagram schematically illustrating a direct-current (DC) voltage conversion device according to a first embodiment of the present invention.

FIG. 2 is a diagram schematically illustrating a direct-current (DC) voltage conversion device according to a first embodiment of the present invention. Referring to FIG. 2, the first embodiment of the DC voltage conversion device of the present invention is introduced as follows. The DC voltage conversion device 2 includes a resonate driving device 21, at least two first transformers 22, at least two second transformers 23, at least two third transformers 24, a rectifying device 25, and an output capacitor 26. The primary sides of the first transformers 22 22 are connected in series via at least one first conductive wire 221. The primary sides of the first transformers 22 have a first input I1 and a second input I2. The first input I1 is coupled to the resonate driving device 21 via a second conductive wire 222. The secondary side of each of the first transformers 22 has a first output O1 and a second output O2. The first outputs O1 of the first transformers 22 are respectively coupled to the rectifying device 25 via at least two seventh conductive wires 223. The primary sides of the second transformers 23 are connected in series via at least one third conductive wire 231. The primary sides of the second transformers 23 have a third input I3 and a fourth input I4. The third input I3 is coupled to the resonate driving device 21 via a fourth conductive wire 232. The secondary side of each of the second transformers 23 has a third output O3 and a fourth output O4. The third outputs O3 of the second transformers 23 are respectively coupled to the rectifying device 25 via at least two eighth conductive wires 233. The primary sides of the third transformers 24 are connected in series via at least one fifth conductive wire 241. The primary sides of the third transformers 24 are connected in series via at least one fifth conductive wire 241. The primary sides of the third transformers 24 have a fifth input 15 and a sixth input 16. The fifth input 15 is coupled to the resonate driving device 21 via a sixth conductive wire 242. The secondary side of each of the third transformers 24 has a fifth output O5 and a sixth output O6. The fifth outputs O5 of the third transformers 24 are respectively coupled to the rectifying device 25 via at least two ninth conductive wires 243. The second input 12, the fourth input 14, and the sixth input 16 are coupled to each other. The second output O2, the fourth output O4, and the sixth output O6 are coupled to each other. The rectifying device 25 is coupled to the first output O1, the third output O3, and the fifth output O5. The output capacitor 26 is connected to the rectifying device 25 in parallel.

For convenience and clarity, the number of each of the first transformer 22, the second transformer 23, and the third transformer 24 is two, and the number of the first conductive wire 221, the third conductive wire 231, and the fifth conductive wire 241 is one. The total number of the first transformers 22, the second transformers 23, and the third transformers 24 is N times 3, wherein N is a positive integer larger than or equal to 2. The total number of the first transformers 22 is equal to the total number of the second transformers 23 and equal to the total number of the third transformers 24. When the numbers of the first transformers 22, the second transformers 23, and the third transformers 24 increase, the numbers of the seventh conductive wires 223, the eighth conductive wires 233, and the ninth conductive wires 243 correspondingly increase. Compared with the architecture of FIG. 1, at least six transformers of the first embodiment are used lest the large volume of a single transformer occupy a large space. The layout of the transformers of the first embodiment is more flexible and easy to perform a heat treatment. In addition, the primary sides of the transformers are connected in series. Thus, the number of turns of the primary sides can be reduced to reduce copper loss. The secondary sides of the transformers are connected in parallel. Thus, the root-mean-square value of the current of the secondary side can be reduced to 65 A. If the current density of the secondary side is 6 A/mm$^2$, it is easy to produce 1300 Litz wires each having diameter of 0.1 mm Since the primary sides are connected in series and the secondary sides are connected in parallel, the DC voltage conversion device uniformly outputs low current and high current, such as the output specification of 100 V and 200 A and the output specification of 400 V and 50 A.

In some embodiments of the present invention, the total length of the first conductive wire and the second conductive wire, the total length of the third conductive wire and the fourth conductive wire, and the total length of the fifth conductive wire and the sixth conductive wire are equal. The total length of the seventh conductive wires, the total length of the eighth conductive wires, and the total length of the ninth conductive wires are equal. The resonate driving device 21 receives a DC input voltage Vi and transmits the DC input voltage Vi to the rectifying device 25 through the first transformers 22, the second transformers 23, and the third transformers 24, thereby generating a DC output voltage Vo across the output capacitor 26. In a multi-phase DC voltage conversion device, the difference among inductance formed by conductive wires of multiple phases is too large, which causes non-uniform output current. Thus, the leakage inductance formed by the wires of each phase is very important. The DC voltage conversion device 2 has at least two transformers corresponding to each phase in order to effectively balance the lengths of conductive wires and leakage inductance of all phases, thereby outputting uniform current.

Figure 3:
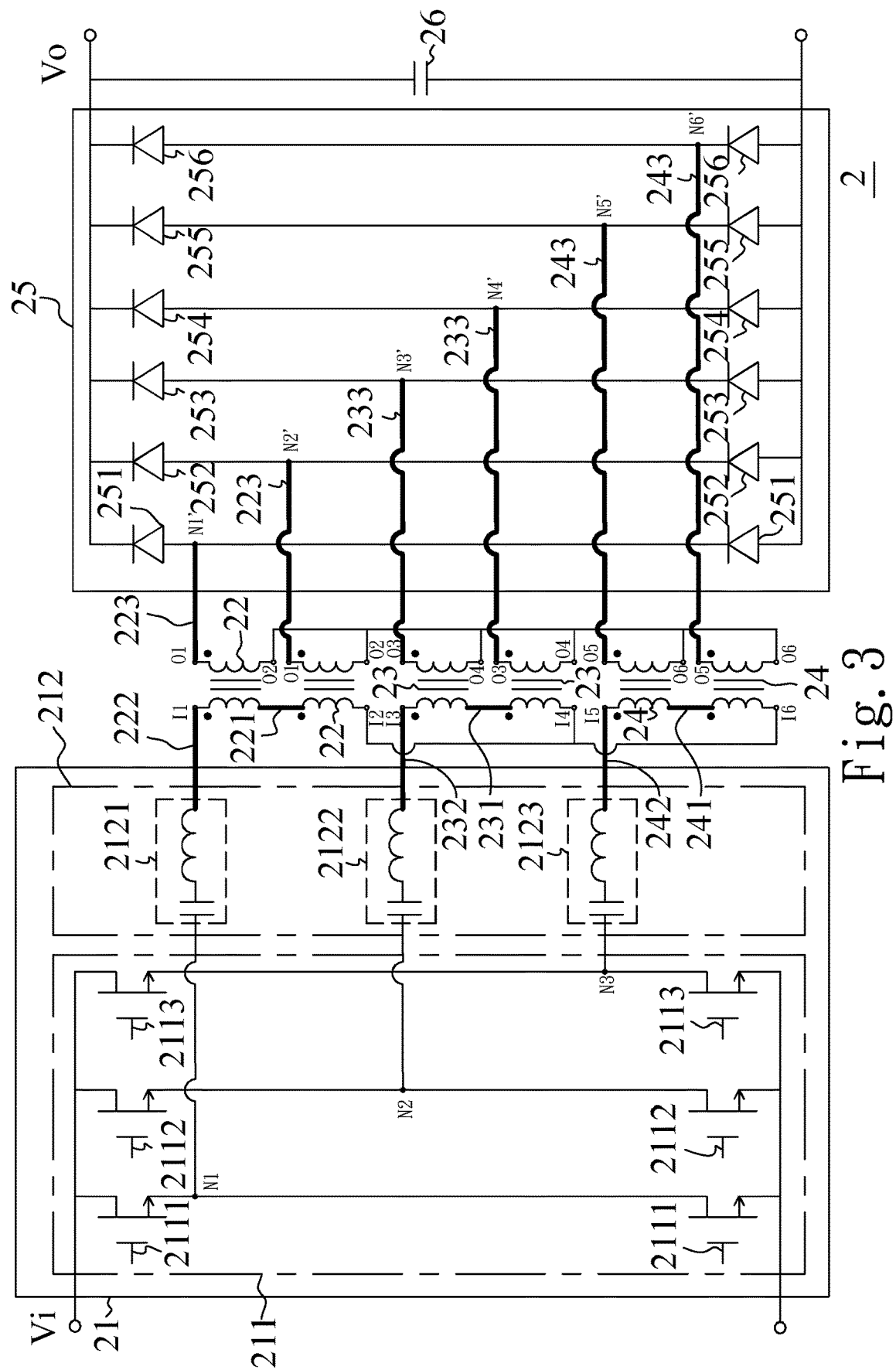
FIG. 3 is a diagram schematically illustrating a direct-current (DC) voltage conversion device according to a second embodiment of the present invention.

FIG. 3 is a diagram schematically illustrating a direct-current (DC) voltage conversion device according to a second embodiment of the present invention. Referring to FIG. 3, the second embodiment of the DC voltage conversion device of the present invention is introduced as follows. The first embodiment is different from the second embodiment in the resonate driving device 21 and the rectifying device 25. In the second embodiment, the resonate driving device 21 may include a current switching device 211 and a resonate circuit 212. The resonate circuit 212 is coupled to the current switching device 211, the second conductive wire 222, the fourth conductive wire 232, and the sixth conductive wire 242.

The current switching device 211 may include two first electrical switches 2111 connected in series, two second electrical switches 2112 connected in series, and two third electrical switches 2113 connected in series. For example, the first electrical switches 2111, the second electrical switches 2112, and the third electrical switches 2113 are N-channel metal oxide semiconductor field effect transistors (NMOSFETs), but the present invention is not limited thereto. A node N1 between the two first electrical switches 2111 is coupled to the resonate circuit 212. A node N2 between the two second electrical switches 2112 is coupled to the resonate circuit 212. A node N3 between the two third electrical switches 2113 is coupled to the resonate circuit 212. The first electrical switches 2111 are connected to the second electrical switches 2112 in parallel. The first electrical switches 2111 are connected to the third electrical switches 2113 in parallel. The resonate circuit 212 may include a first resonate tank 2121, a second resonate tank 2122, and a third resonate tank 2123. The first resonate tank 2121 is coupled between the second conductive wire 222 and the node N1 of the current switching device 211. The second resonate tank 2122 is coupled between the fourth conductive wire 232 and the node N2 of the current switching device 211. The third resonate tank 2123 is coupled between the sixth conductive wire 242 and the node N3 of the current switching device 211. Each of the first resonate tank 2121, the second resonate tank 2122, and the third resonate tank 2123 includes an inductor and a capacitor connected in series, but the present invention is not limited thereto.

The rectifying device 25 may include two first rectifiers 251 connected in series, two second rectifiers 252 connected in series, two third rectifiers 253 connected in series, two fourth rectifiers 254 connected in series, two fifth rectifiers 255 connected in series, and two sixth rectifiers 256 connected in series. A node N1' between the two first rectifiers 251 and a node N2' between the two second rectifiers 252 are respectively coupled to the first outputs O1 of the first transformers 22. A node N3' between the two third rectifiers 253 and a node N4' between the two fourth rectifiers 254 are respectively coupled to the third outputs O3 of the second transformers 23. A node N5' between the two fifth rectifiers 255 and a node N6' between the two sixth rectifiers 256 are respectively coupled to the fifth outputs O5 of the third transformers 24. The first rectifiers 251 are connected to the second rectifiers 252 in parallel. The first rectifiers 251 are connected to the third rectifiers 253 in parallel. The first rectifiers 251 are connected to the fourth rectifiers 254 in parallel. The first rectifiers 251 are connected to the fifth rectifiers 255 in parallel. The first rectifiers 251 are connected to the sixth rectifiers 256 in parallel. The first rectifiers 251 are connected to the output capacitor 26 in parallel. The first rectifiers 251, the second rectifiers 252, the third rectifiers 253, the fourth rectifiers 254, the fifth rectifiers 255, and the sixth rectifiers 256 are implemented with diodes, but the present invention is not limited thereto. In such a case, the node N1' is used as the anode of one of the first rectifiers 251 and the cathode of the other of the first rectifiers 251. The node N2' is used as the anode of one of the second rectifiers 252 and the cathode of the other of the second rectifiers 252. The node N3' is used as the anode of one of the third rectifiers 253 and the cathode of the other of the third rectifiers 253. The node N4' is used as the anode of one of the fourth rectifiers 254 and the cathode of the other of the fourth rectifiers 254. The node N5' is used as the anode of one of the fifth rectifiers 255 and the cathode of the other of the fifth rectifiers 255. The node N6' is used as the anode of one of the sixth rectifiers 256 and the cathode of the other of the sixth rectifiers 256. In the second embodiment, there are 12 diodes. Compared with the first embodiment, the layout of diodes of the second embodiment is more flexible and easier to perform a heat treatment.

According to the embodiments provided above, the DC voltage conversion device connects the primary sides of transformers in series and connects the secondary sides of the transformers in parallel. Thus, the DC voltage conversion device is favorable layout and easy to perform a heat treatment and fabricate Litz wires. The DC voltage conversion device can reduce copper loss and uniformly output high current and high current when achieving the same high power.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A direct-current (DC) voltage conversion device comprising:
    a resonate driving device;
    at least two first transformers with primary sides thereof connected in series via at least one first conductive wire, wherein the primary sides of the at least two first transformers have a first input and a second input, the first input is coupled to the resonate driving device via a second conductive wire, and a secondary side of each of the at least two first transformers has a first output and a second output;
    at least two second transformers with primary sides thereof connected in series via at least one third conductive wire, wherein the primary sides of the at least two second transformers have a third input and a fourth input, the third input is coupled to the resonate driving device via a fourth conductive wire, and a secondary side of each of the at least two second transformers has a third output and a fourth output;
    at least two third transformers with primary sides thereof connected in series via at least one fifth conductive wire, wherein the primary sides of the at least two third transformers have a fifth input and a sixth input, the fifth input is coupled to the resonate driving device via a sixth conductive wire, a secondary side of each of the at least two third transformers has a fifth output and a sixth output, the second input, the fourth input, and the sixth input are coupled to each other, and the second output, the fourth output, and the sixth output are coupled to each other; and
    a rectifying device coupled to the first output, the third output, and the fifth output.

2. The DC voltage conversion device of claim 1, wherein a total length of the at least one first conductive wire and the second conductive wire, a total length of the at least one third conductive wire and the fourth conductive wire, and a total length of the at least one fifth conductive wire and the sixth conductive wire are equal.

3. The DC voltage conversion device of claim 1, wherein the rectifying device is respectively coupled to the first outputs of the at least two first transformers via at least two seventh conductive wires, the rectifying device is respectively coupled to the third outputs of the at least two second transformers via at least two eighth conductive wires, the rectifying device is respectively coupled to the fifth outputs of the at least two third transformers via at least two ninth conductive wires, and a total length of the at least two seventh conductive wires, a total length of the at least two eighth conductive wires, and a total length of the at least two ninth conductive wires are equal.

4. The DC voltage conversion device of claim 1, wherein the rectifying device comprises:
    two first rectifiers connected in series;
    two second rectifiers connected in series, wherein a node between the two first rectifiers and a node between the two second rectifiers are respectively coupled to the first outputs of the at least two first transformers;
    two third rectifiers connected in series;
    two fourth rectifiers connected in series, wherein a node between the two third rectifiers and a node between the two fourth rectifiers are respectively coupled to the third outputs of the at least two second transformers;
    two fifth rectifiers connected in series; and
    two sixth rectifiers connected in series, wherein a node between the two fifth rectifiers and a node between the two sixth rectifiers are respectively coupled to the fifth outputs of the at least two third transformers, and the first rectifiers are connected to the second rectifiers, the third rectifiers, the fourth rectifiers, the fifth rectifiers, and the sixth rectifiers.

5. The DC voltage conversion device of claim 4, wherein the first rectifiers, the second rectifiers, the third rectifiers, the fourth rectifiers, the fifth rectifiers, and the sixth rectifiers are diodes.

6. The DC voltage conversion device of claim 1, wherein the resonate driving circuit comprises:
    a current switching device; and
    a resonate circuit coupled to the current switching device, the second conductive wire, the fourth conductive wire, and the sixth conductive wire.

7. The DC voltage conversion device of claim 6, wherein the current switching device comprises:
    two first electrical switches connected in series, wherein a node between the two first electrical switches is coupled to the resonate circuit;
    two second electrical switches connected in series, wherein a node between the two second electrical switches is coupled to the resonate circuit; and
    two third electrical switches connected in series, wherein a node between the two third electrical switches is coupled to the resonate circuit, and the first electrical switches are connected to the second electrical switches in parallel and connected to the third electrical switches in parallel.

8. The DC voltage conversion device of claim 7, wherein the first electrical switches, the second electrical switches, and the third electrical switches are N-channel metal oxide semiconductor field effect transistors (NMOSFETs).

9. The DC voltage conversion device of claim 6, wherein the resonate circuit comprises:
- a first resonate tank coupled between the second conductive wire and the current switching device;
- a second resonate tank coupled between the fourth conductive wire and the current switching device; and
- a third resonate tank coupled between the sixth conductive wire and the current switching device.

10. The DC voltage conversion device of claim 9, wherein each of the first resonate tank, the second resonate tank, and the third resonate tank comprises an inductor and a capacitor connected in series.

11. The DC voltage conversion device of claim 1, wherein total number of the at least two first transformers, the at least two second transformers, and the at least two third transformers is 3×N, and N is a positive integer larger than or equal to 2.

\* \* \* \* \*